United States Patent [19]

Stark

[11] 3,953,055

[45] Apr. 27, 1976

[54] OFF-HIGHWAY TRAILER HITCH
[75] Inventor: Allan P. Stark, Irwin, Pa.
[73] Assignees: Robert L. McCormick; S. Ray Simon Associates Co., both of N. Huntingdon, Pa. ; part interest to each
[22] Filed: June 30, 1975
[21] Appl. No.: 591,427

[52] U.S. Cl. .................................................. 280/504
[51] Int. Cl.² ........................................... B60D 1/04
[58] Field of Search ........... 280/504, 506, 509, 510, 280/514

[56] References Cited
UNITED STATES PATENTS

| | | | |
|---|---|---|---|
| 896,775 | 8/1908 | Trankle | 280/504 |
| 2,453,139 | 11/1948 | Kleinkort | 280/504 |
| 2,607,604 | 8/1952 | Nelson | 280/504 |

*Primary Examiner*—Robert R. Song
*Attorney, Agent, or Firm*—Harold A. Williamson, Sr.

[57] ABSTRACT

The hitch assembly of the invention is comprised of a horizontal member adapted to be secured to a tongue of the object to be drawn or pulled. The horizontal member has first and second spaced apart downwardly projecting elements. The first element has a cross-section suitable for engaging an opening in a drawbar of the tractor or object and the first element has a length less than the second element. A latching element is pivotally secured to the second element in an end region of the second element. The latching element has an upwardly extending arm having a portion extending transverse to the horizontal member. In addition, the latching element has a length such that the transverse portion is held by the force of gravity against the end region of the first element.

7 Claims, 6 Drawing Figures

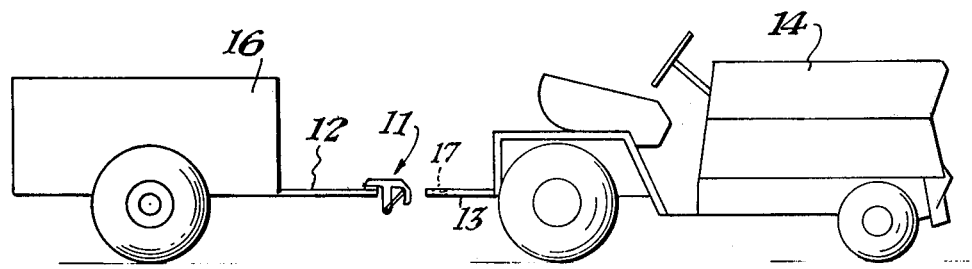
Fig.1.
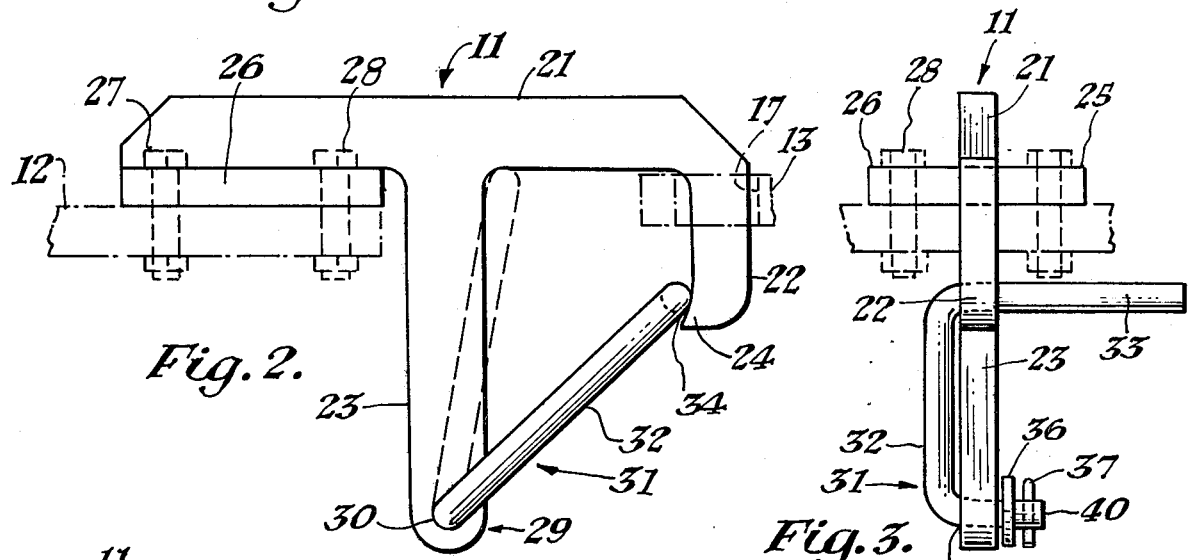
Fig.2.
Fig.3.
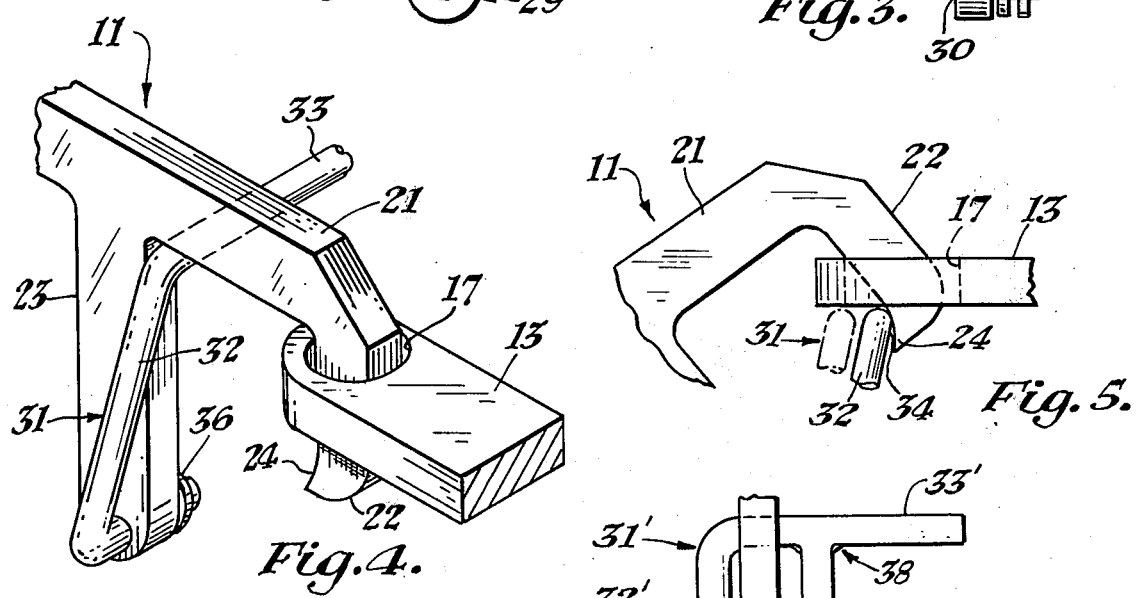
Fig.4.
Fig.5.
Fig.6.

OFF-HIGHWAY TRAILER HITCH

This invention relates to a hitch assembly for use in association with an object to be drawn by another object.

More specifically this invention relates to a hitch assembly for use with such objects as trailers, carts, garden equipment, and lawn equipment in an off-highway environment. The object which does the drawing is usually a small horsepower rated lawn or garden tractor and the owner of such equipment desires a quick, easy, strong hitch which is readily securable to a drawbar on the rear of the tractor.

The hitch assembly of the invention is comprised of a horizontal member adapted to be secured to a tongue of the object to be drawn or pulled. The horizontal member has first and second spaced apart downwardly projecting elements. The first element has a cross-section suitable for engaging an opening in a drawbar of the tractor or object and the first element has a length less than the second element. A latching element is pivotally secured to the second element in an end region of the second element. The latching element has an upwardly extending arm having a portion extending transverse to the horizontal member. In addition, the latching element has a length such that the transverse portion is held by the force of gravity against the end region of the first element.

Today more than at any other time in history there is being experienced a rapid proliferation of powered lawn or garden type equipment with the attendant desire of most owners of such equipment to be able to quickly and safely attach all manner of gear to be towed by the powered equipment.

Many hitch arrangements of the prior art consist of little more than a hook-shaped member designed to grasp an opening in a drawbar on the powered equipment. Yet others provide a pin and yoke arrangement which requires some juggling, pushing and pulling to bring a yoke portion of the drawn object into alignment with a hole in the drawbar.

In the first enumerated prior art approach the party employing a mere hook arrangement must exercise great care in the loading of the towed equipment in order to ensure that the center of gravity of the towed object is at a point between the wheels of the drawn object and the drawbar of the powered equipment. This arrangement is necessary in order that the towed object always apply a downward force on the hitch connection, thereby assuring the hitch remain engaged.

It is therefore a primary object of this invention to provide a hitch assembly that can readily be connected to an existing object to be towed and the hitch assembly dropped into mating engagement with an opening on a drawbar with a resultant pressure opening of a pivoted latch and gravitational locking of the latch.

Another object of this invention is to provide a latch assembly with but a single moving part that is easy to manufacture, assemble and employ.

In the attainment of the foregoing objects the hitch assembly is comprised of a horizontal member adapted to be secured to a tonque of an object to be drawn. The horizontal member has first and second spaced apart downwardly projecting elements. The first element which has a length less than the second element has an end region cross-section suitable for mating engagement with an opening in a drawbar carried by a power driven machine or tractor. The end region of the first element has a lip portion thereof extending toward the second element. The second element has an end region remote from the horizontal member with a latching element pivotally secured in the end region. The latching element is constructed so as to provide an upwardly extening arm having an integral portion thereof extending transverse to the horizontal member. The latching element has a length such that the transverse portion is held by gravitational force against the lip portion of the first element's end region. The transverse portion has a length sufficient to allow for manual grasping to thereby overcome the gravitational force and permit pivotal movement of the latching element away from the first element's lip and end region, whereby the hitch assembly may be moved vertically to disengage the drawn object from the drawbar of the power driven machine or tractor. It is of significance to the operation of the hitch assembly of this invention that the distance between the pivotal securing of the latch element to the second element and the transverse portion is greater than the length of the first element and less than the length of the second element. This dimensional relationship allows for the latching element to be pivotally moved upwardly into a nearly vertical position allowing for the ready removal of the hitch assembly from the drawbar of the tractor or powered equipment.

Other objects and advantages of the present invention will become apparent from the ensuing description of illustrative embodiments thereof, in the course of which reference is had to the accompanying drawings in which:

FIG. 1 is a view of a power vehicle shown separated from a trailer on which the subject trailer hitch of the invention is shown secured;

FIG. 2 is a side view of the trailer hitch embodying the invention;

FIG. 3 is an end view of FIG. 2 showing further details of the invention;

FIG. 4 is a perspective view showing the three dimensional configurations of the hitch embodying the invention;

FIG. 5 illustrates a portion of the hitch with the hitch experiencing exaggerated hitch to drawbar positioning; and FIG. 6 is a partial showing of another embodiment of the invention.

A description of the above embodiments will follow and then the novel features of the invention will be presented in the appended claims.

Reference is now made to FIG. 1 which illustrates a typical environment for employment of the invention. There is depicted a power driven vehicle or lawn tractor 14, which has extending from the rear thereof a drawbar 13, which drawbar 13 typically is provided with an opening 17. The opening 17 in the drawbar 13 is provided to accomplish the routine connection of objects to be drawn by the tractor 14. Immediately to the left of the drawbar 13 there is depicted a hitch assembly 11 which embodies the invention. The details and operation of the hitch assembly will be explained in greater detail hereinafter. The hitch assembly 11 is shown positioned on the tongue 12 of the cart 16, which cart represents the object to be drawn. The details of the hitch assembly 11 and the manner in which it is secured to the tongue 12 will become evident as the ensuing description unfolds.

FIG. 2 illustrates in detail a hitch embodying the invention. FIG. 2 should be viewed in conjunction with the end view of the hitch assembly 11, as shown in FIG. 3. The description that immediately follows will be directed to the details shown in both FIG. 2 and FIG. 3.

Accordingly, the hitch assembly 11 is comprised of a horizontal member 21 which has secured or integrally formed therewith a pair of flanges 25, 26. These flanges are fitted with openings through which bolts 27, 28 pass. Nuts on the ends of the bolts 27, 28 are not referenced and it should be understood that the manner in which the hitch assembly is secured to the tongue 12 forms no part of the invention. Accordingly, any manner known in the art for securing the horizontal member 21 to the tongue 12 is contemplated to fall within the purview of the invention.

The horizontal member 21 has extending downwardly therefrom a first element 22 and a second element 23. The first element 22 has a length shorter than the second element 23 and is provided with a cross section such that it may readily pass through the opening 17 in drawbar 13. The cross-section of the first element 22 is rectangular and this rectangular cross-section cooperates with a general circular opening 17 in the drawbar to provide an enhanced frictional engagement between the hitch and the drawbar. At the bottom end of the first element 22 is an enlarged portion or lip 24 which is directed toward the second element 23.

The second element 23 has in its end region 29 a pivotal connection 31 for latch element 31. The latch element 31 has an upwardly extending arm 32 with an upper end 34 which is shown in abutting relationship with lip 24. There is also shown in FIG. 2 the latch element in phantom outline in a position assumed after counterclockwise motion has been experienced. The manner of moving the latch element 31 can be appreciated when FIG. 3 is studied and it is noted that the upwardly extending arm 32 of the latch element 31 has integrally formed therewith a transverse portion 33. The transverse portion 33 is at right angles to the horizontal member and has a length sufficient to be grasped manually. The length and inherent weight of the transverse portion 33 provide in addition an inertial force due to gravity which tends to hold the latching element 31 and its upper end 34 in abutting contact with lip 24 of the first element 22. In viewing FIG. 3 it will be noted that the latching element 31 has integral with the arm 32 a shaft 40 which passes through the pivotal connection 30 of the end region 29 of the second element 23. A washer 36 and cotter pin 37 are provided to secure the latch element 31 to the second element 23. The manner in which the latch element 31 is secured is not critical to this invention, and any manner of securing means is contemplated as falling within the scope of the invention.

In viewing FIG. 2 it can be seen that in the practice of the invention the relative dimensions of the first element 22, the second element 23, and the latching element 31 are critical to the operativeness of the invention. Accordingly the distance between the pivotal connection 30 of the latch element 31 and the upper end 34 with its transverse portion 33 is of a greater length than the first element 22 and less than the length of the second element 23.

The spacial relationship is graphically set forth in FIG. 4 which provides a three dimensional perspective of hitch assembly 11 embodying the invention. FIG. 4 shows latch element 31 in the position depicted by the phantom lines of FIG. 2 referenced above.

FIG. 5 illustrates an end portion of the hitch assembly 11 with the hitch experiencing an extreme movement relative to the drawbar 13. This situation might well occur in travel over rough terrain. It can be appreciated that no matter how violent the relative movement of the hitch assembly 11 with respect to the drawbar 13 the latch element 32 will prevent the first element 22 from disengaging the opening 17 in the drawbar 13 because the upper end of the latch arm 34 comes into abutting contact with the bottom of the drawbar 13. The safety action can be seen in operation when the position of the phantom line of the latch element 31 is studied in this FIG. 5.

FIG. 6 represents another embodiment of the invention which, for purposes of description, employs the same reference numerals for similar components described in earlier figures. These reference numerals have been distinguished by the addition of a prime ('). Accordingly, we see in FIG. 6 a structurally reinforced latch element 31' which has a bar element 35 secured by welding at points 38, 39 to transverse portion 33' and shaft 40'. This highly desirable arrangement does away with the need for the washer 36 and cotter pin 37 arrangement of FIG. 3 and provides a virtually indestructible latch element construction capable of withstanding rough treatment.

From the above description it can be seen that there has been provided a new, novel and efficient hitch assembly that can be readily removed from a drawbar by merely pulling upwardly on the transverse portion 33. The hitch assembly can be attached to the drawbar without manually touching the latch element 31 by merely aligning the first element 22 over a drawbar opening and allowing gravity to force the first element 22 through the opening 17 which results in the latch element 31 being displaced during passage of the end of the drawbar after which the latch element 31 falls against the lip 24 and the hitch is ready to go.

While the present invention has been illustrated and disclosed in connection with the details of the illustrative embodiments thereof, it should be understood that those illustrative embodiments are only to be limitative of the invention as set forth in the accompanying claims.

Having thus described my invention, what I claim is:

1. A hitch assembly for use in association with an object to be drawn by another object, said assembly comprising
    a horizontal member adapted to be secured to said object to be drawn,
    said horizontal member having first and second spaced apart downwardly projecting elements,
    said first element having a cross-section and region suitable for engaging an opening in said other object and having a length less than said second element,
    a latching element pivotally secured to said second element in an end region of said second element,
    said latching element having an upwardly extending arm having a portion extending transverse to said horizontal member,
    said latching element having a length such that said transverse portion is held by gravitational force against an end region of said first element.

2. The hitch assembly of claim 1 wherein said end region of said second element is remote from said horizontal member.

3. The hitch assembly of claim 2 wherein said first element end region has a portion extending toward said second element.

4. The hitch assembly of claim 3, wherein said latching element transverse portion has a length sufficient to allow manual grasping to thereby overcome said gravitational force and permit pivotal movement of said latching element away from said first element end region, whereby said hitch assembly may be moved vertically to disengage said drawn object from said other object.

5. The hitch assembly of claim 4, wherein the distance between said pivotal securing of the latch element to said second element and said transverse portion is greater than the length of said first element and less than the length of said second element.

6. The hitch assembly of claim 1, wherein said latching element upwardly extending arm portion is comprised of a pair of elongated elements secured to said transverse portion.

7. The hitch assembly of claim 1, wherein said first element cross-section is rectangular whereby there is obtained an enhanced frictional engagement between said hitch assembly and a generally circular cross-sectional opening in a drawbar of said object that draws the object to which said hitch assembly is attached.

* * * * *